Aug. 22, 1967            W. BROOKS            3,337,825
REPEAT-CYCLE SWITCH HAVING AN ELECTRIC MOTOR
DRIVING A RECIPROCATING ACTUATOR FOR
A PLURALITY OF ELECTRICAL SWITCHES
Filed March 14, 1966            4 Sheets-Sheet 1
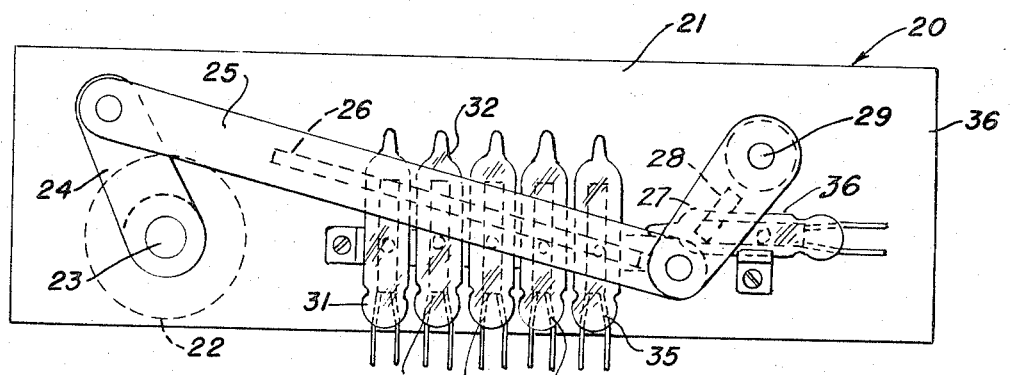
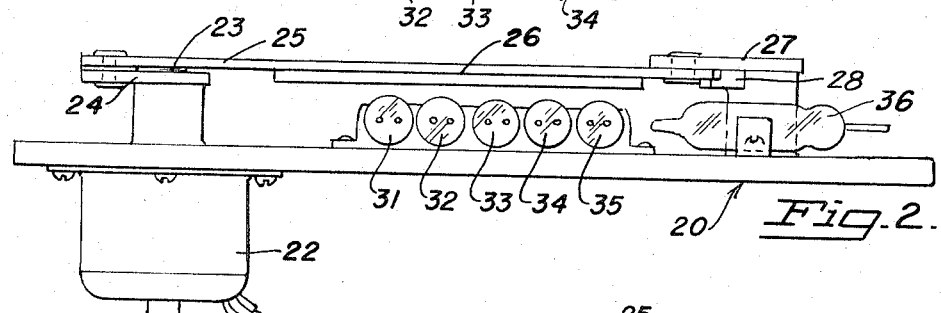
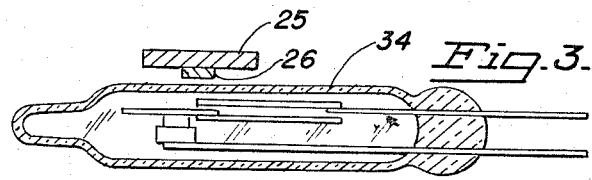
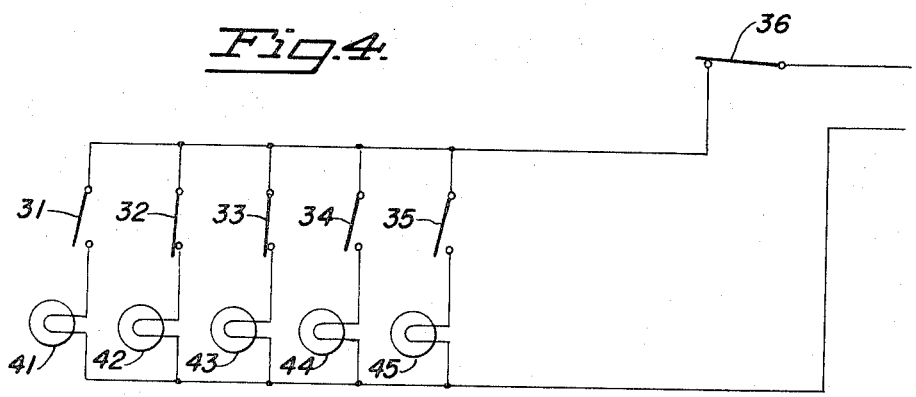
INVENTOR
WILLIAM BROOKS
BY
Owen, Wickersham & Erickson
ATTORNEYS Aug. 22, 1967  W. BROOKS  3,337,825
REPEAT-CYCLE SWITCH HAVING AN ELECTRIC MOTOR
DRIVING A RECIPROCATING ACTUATOR FOR
A PLURALITY OF ELECTRICAL SWITCHES
Filed March 14, 1966  4 Sheets-Sheet 2
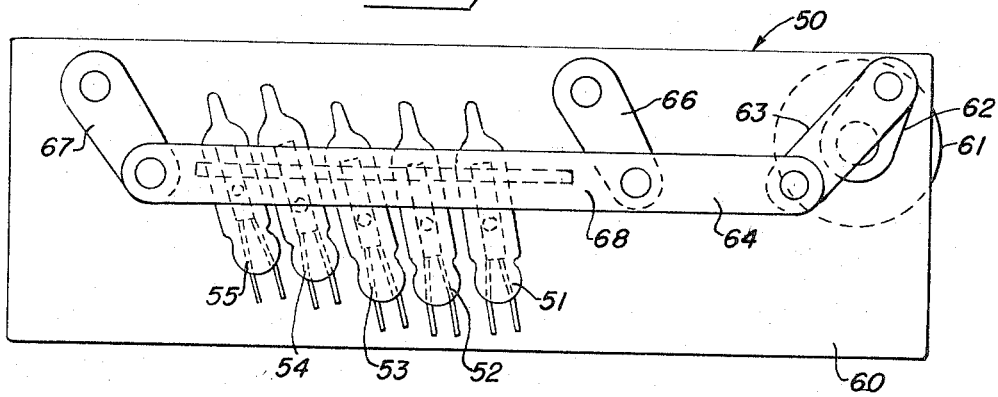
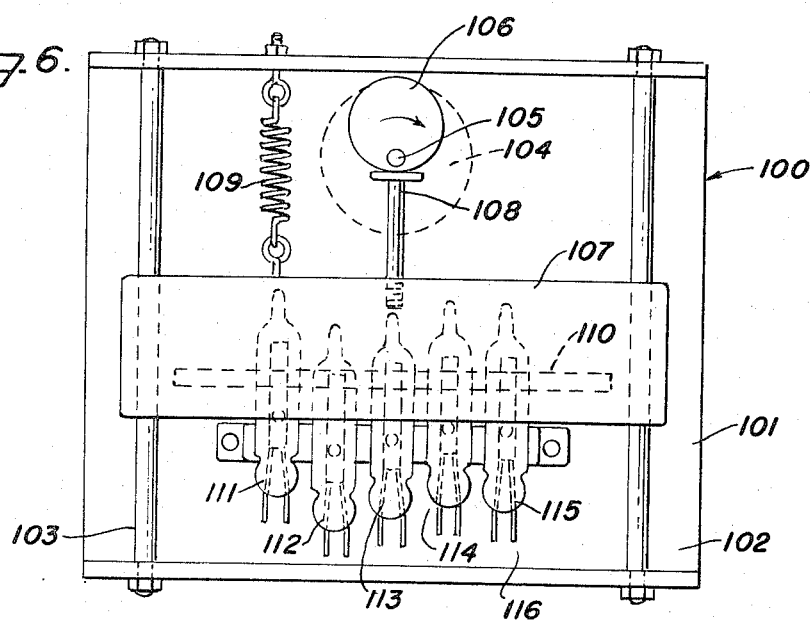
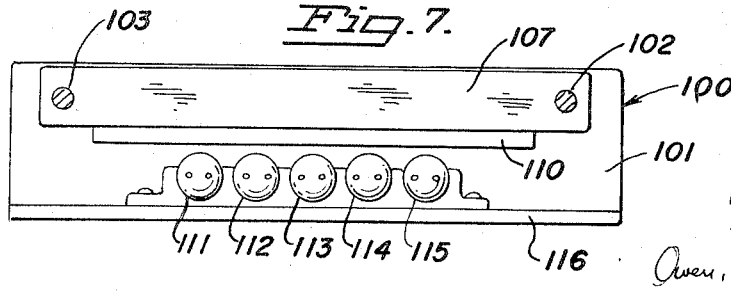
INVENTOR
WILLIAM BROOKS
BY
Owen, Wickersham & Erickson
ATTORNEYS Aug. 22, 1967   W. BROOKS   3,337,825
REPEAT-CYCLE SWITCH HAVING AN ELECTRIC MOTOR
DRIVING A RECIPROCATING ACTUATOR FOR
A PLURALITY OF ELECTRICAL SWITCHES
Filed March 14, 1966                           4 Sheets-Sheet 3
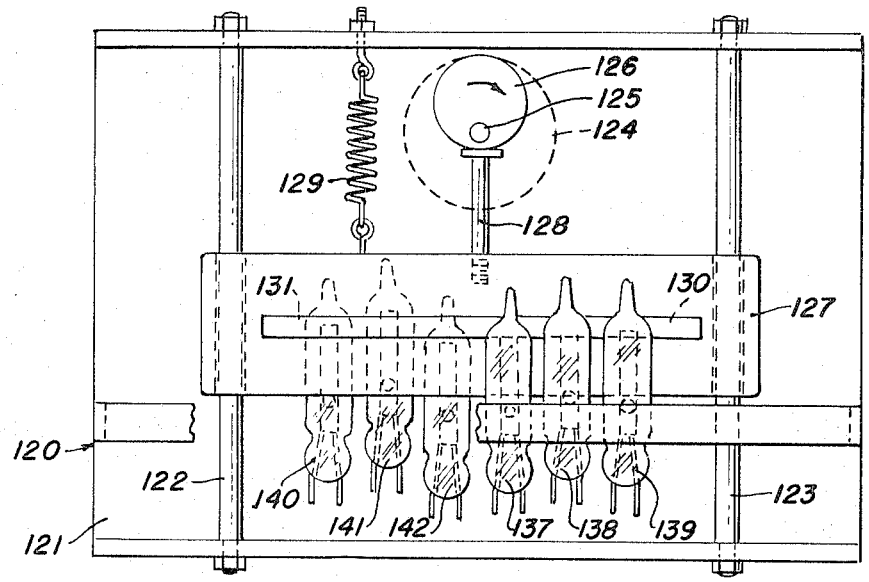
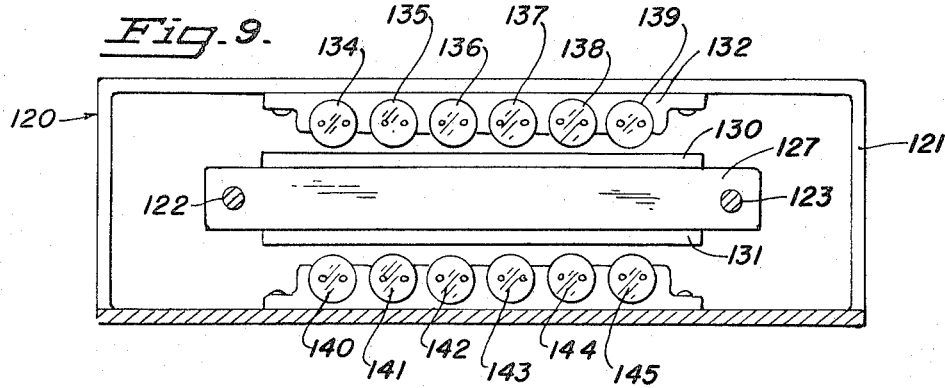
INVENTOR
WILLIAM BROOKS
BY
Owen, Wickersham & Erickson
ATTORNEYS

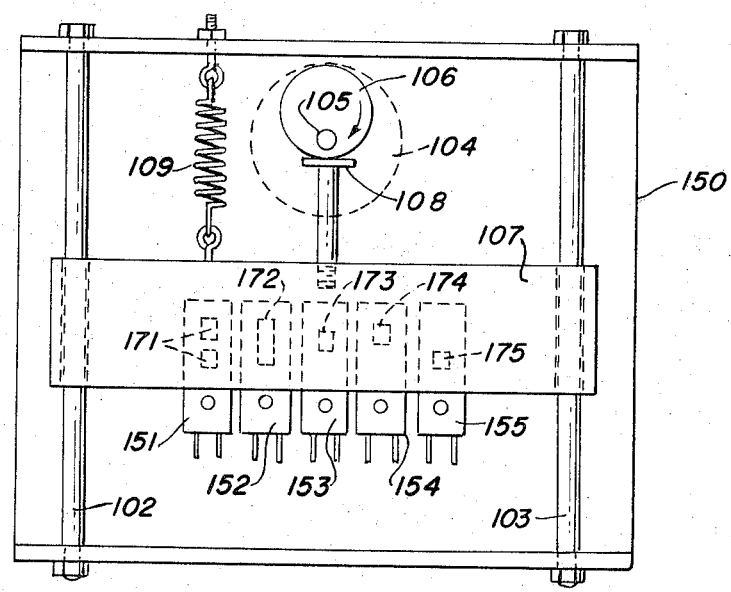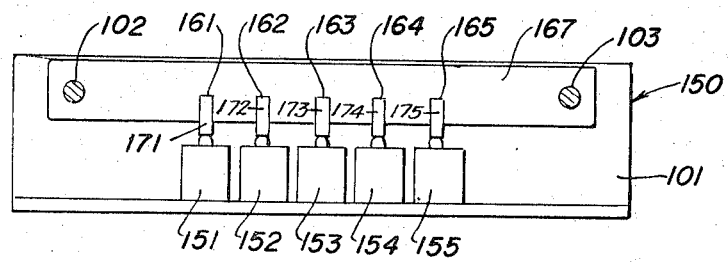

United States Patent Office 3,337,825
Patented Aug. 22, 1967

3,337,825
REPEAT-CYCLE SWITCH HAVING AN ELECTRIC MOTOR DRIVING A RECIPROCATING ACTUATOR FOR A PLURALITY OF ELECTRICAL SWITCHES
William Brooks, 1042 Inverness Way,
Sunnyvale, Calif. 94087
Filed Mar. 14, 1966, Ser. No. 533,896
6 Claims. (Cl. 335—68)

This invention relates to improvements in program or repeat-cycle switches.

In the past, such switches have usually employed a series of cams mounted on a motor-driven shaft to actuate a plurality of switches, the position and shape of each cam being used to determine the time during each cycle when its switch will be closed. These cam-operated devices have been expensive, because the cams have generally had to be machined separately for each application. When adjustable cams were used, they were even more expensive, because several pieces of each cam had to be machined. Moreover, the mechanical operation of the cams resulted in noise and mechanical wear, the noise often being objectionable, particularly where the timer was used in an indoor display.

The cams operated the switches by means of push rods or levers, a type of operation which was sometimes objectionable because it was difficult to protect the switch contacts from undesirable gases that caused oxidation or arcing, since it was difficult to enclose the switch contacts. Some environments made the oxidation or arcing particularly objectionable.

The present invention solves the above problems and makes it possible to produce repeat-cycle or program switches less expensively while obtaining even better operation. In this invention, none of the switches are operated by cams. In some forms of the invention a simpler type of mechanical operation is employed, while in other forms of the invention the switches are magnetically actuated and hence their contacts can be fully enclosed and protected from gas. Almost noiseless operation is obtainable, and the very low noise level of operation is an attractive feature of the invention.

The invention provides a timer which is readily and inexpensively adjustable, for it can be fabricated with few or no machined parts, and the timing sequence can be adjusted without exchanging any parts or (in other forms of the invention) by exchanging a few simple parts.

Other objects and advantages of the invention will appear from the following description of some preferred embodiments thereof.

In the drawings:

FIG. 1 is a view in elevation of a repeat-cycle switch device embodying the principles of the invention.

FIG. 2 is a bottom plan view of the device of FIG. 1.

FIG. 3 is a detail view in cross section of one of the magnetic reed switches with the associated moving magnet shown in switch-actuating position.

FIG. 4 is a simple electrical circuit diagram of the device of FIG. 1.

FIG. 5 is a view like FIG. 1 of a modified form of device also embodying the principles of the invention.

FIG. 6 is a top plan view of another modified form of the invention.

FIG. 7 is an end elevation view of the device of FIG. 6.

FIG. 8 is a view in end elevation of another modified form of the invention.

FIG. 9 is a view in side elevation of the device of FIG. 8.

FIG. 10 is a timing diagram showing one operating pattern that may be achieved with the form of the invention shown in FIGS. 7 and 8.

FIG. 11 is a top plan view of another modified form of the invention.

FIG. 12 is an end elevation view of the device of FIG. 10.

The forms of the invention shown in FIGS. 1–9 employ magnetic switch elements, preferably reed-type switches enclosed in a sealed glass envelope and operate them by permanent magnets which are moved past the envelopes. Position alone determines when a switch is actuated, so that by a change of location a change in timing can be made. Thus, a new program can be set up without removing or adding parts. This arrangement drastically reduces the mechanical wear on switches and the noise, for there is no rubbing of the parts.

The assembly 20 of FIGS. 1–4 includes a supporting member 21, on which is mounted a motor 22, such as a synchronous clock motor. To the motor's shaft 23 is secured a link 24 to which is pivoted a long bar 25, on one side of which is secured a permanent magnet 26. The far end of the bar 25 is pivoted to a link 27 which also has a permanent magnet 28 mounted on it and is mounted at its distant end to a stationary pivot 29. The link 24 moves in a circular path while the link 27 swings back and forth, and the bar 25 and magnet 28 move in a combination fore-and-aft, up-and-down, and swinging movement.

A series of magnetic switches 31, 32, 33, 34 and 35 may be mounted on the support member 21 at desired locations to give a desired sequence and timing; these five switches (and there may of course be more or fewer of them) are all operated by the magnet 26 on the bar 25. Another magnetic switch 36 is mounted on the support member 21, where it is actuated by the magnet 28 on the link 27.

As shown in FIG. 4, the switches 31, 32, 33, 34 and 35 may all be in parallel with each other, and each be in series with a load 41, 42, 43, 44 and 45, such as a lamp bulb. There may be more switches, as said, as many as loads desired, and various types of loads may be used. The switch 36 is in series with all the parallel switches 31, 32, 33, 34 and 35. The parallel switches may be normally open, and the switch 36 normally closed, or vice versa, or other schemes may be used. For example, the magnet 26 may be used to close the switches 31, 32, 33, 34 and 35 successively at even (or uneven) time intervals and it may hold them all closed until the magnet 28 actuates the switch 36 to open the entire circuit. Other operations are possible by making simple changes.

A modified form of program or repeat-cycle switch 50 is shown in FIG. 5. Here a support member 60 holds a series of switches 51, 52, 53, 54 and 55 (preferably sealed-glass-enclosed magnetic reeds) and a motor 61. The motor 61 drive a link 62 which rocks a link 63. An arm 64, carrying a permanent magnet 65 is pivoted to the link 63 and to turn links 66 and 67 of the same length that are pivoted to the support 60. Hence, the bar or arm 64 has a parallel arm type of linkage and moves up and down and to right and left but does not tilt, remaining horizontal at all times. Vertical adjustment of the switches 51, 52, 53, 54 and 55 achieves the timing quite simply. A sweep switch corresponding to the switch 36 could be added.

FIGS. 6 and 7 show a modified form of the invention wherein a single cam is employed to move a carriage back and forth, the carriage carrying a permament magnet that actuates magnetic switches.

The program switch 100 thus includes a support member 101 having a pair of guide rods 102 and 103 and supporting an electric motor 104 having a shaft 105. A cam 106 is mounted on the shaft 105 and is used to reciprocate a carriage 107 which has a cam follower 108 kept against the cam 106 by a return spring 109 that has one end secured to the carriage 107 and the other end secured to the support 101. The cam 106 and cam follower 108 thus constitute a converter means for converting the unidirectional rotation of the shaft 105 into reciprocating motion. The carriage 107 rides back and forth on the guide rods 102 and 103 and carries a permanent magnet 110. A series of magnetically actuated switches 111, 112, 113, 114 and 115 are mounted on the support 101, the location of each determining when it is actuated. Various circuits can be used and any number of switches. The switches may be mounted on a board 116 instead of directly on the support 101, and the board located as desired.

By shaping the single cam 106, any cyclic motion as a function of time can be generated. The unit can be made wider or a multiple-deck carriage may be used to make the unit 100 operate practically any desired number of circuits.

FIGS. 8 and 9 show a repeat-cycle switch device 120 much like the device 100. It has a main frame or support 121 with a pair of guide rods 122 and 123 and an electric motor 124. The motor's shaft 125 rotates a cam 126 to reciprocate a carriage 127 through a cam-follower 128 and return spring 129. The carriage 127 has a magnet 130 on its upper surface and a magnet 131 on its lower surface. Two boards 132 and 133 are mounted on the support 121, one above the carriage 127 and one below it. Each board 132, 133 has a plurality of magnetic switches; thus the board 132 may have reed-magnet enclosed switches 134, 135, 136, 137, 138 and 139 all operated by the permanent magnet 130, while the board 133 may have similar switches 140, 141, 142, 143, 144 and 145 all operated by the magnet 131. This double deck arrangement thus conserves lateral room.

The switches in the two banks may be cross-connected, and the magnets 130 and 131 may be arranged so that they operate their respective banks at different points in the carriage travel, so that complex operating-time relationships can be achieved. For example, if the magnet 130 is so placed that at the start of travel of the carriage 127 it causes the switches 134, 135, 136, 137, 138 and 139 to open successively, while the magnet 131 is placed so that it causes its associated switches 140, 141, 142, 143, 144, and 145 to close successively, and if the switches at similar points in each bank are connected in series pairs 134, 140 and 135, 141 and 136, 142 and 137, 143 and 138, 144 and 139, 145, then the output circuit for each pair of switches can be made to close for a specific distance of carriage travel and then to open, along the pattern shown in FIG. 10, and the reversal shown therein also obtained. The result is a scanning action for each pair of switches, giving a single pole double throw type of switch.

FIGS. 11 and 12 show how the device 100 can be modified from a magnetic unit into a unit 150 having mechanical operation. The support 101, the motor 104, shaft 105, cam 106, guide rods 102 and 103, the carriage 107, follower 108, and spring 109 remain as before. However, mechanically operated microswitches 151, 152, 153, 154, 155, 156, 157, 158 and 159 are used in place of magnetically operated switches. The underside of the carriage then has a series of slots 161, 162, 163, 164, 165, and in each slot there is one or more corresponding rail 171, 172, 173, 174 and 175 to operate its switch at a time depending on the rail length and longitudinal location on the carriage and on the movement of the carriage 107. The total travel of the carriage 107 is determined by the size and shape of the cam 106.

The insert rails 171, 172, 173, 174 and 175 are easily changed in the field, even by inexperienced people; they are small straight pieces, not expensive cams; so their mechanical fabrication and their assembly is inexpensive and simply. The flat shape of the unit 150 is advantageous in their display unit, such as wall-mounted signs. The program set into the unit 150 is much easier to check visually than in a cam-set unit. A universal time can be fabricated in this manner to save further costs.

To those skilled in the art to which this invention relates, many changes in construction and widely differing embodiments and applications of the invention will suggest themselves without departing from the spirit and scope of the invention. The disclosures and the description herein are purely illustrated and are not intended to be in any sense limiting.

I claim:
1. A program device capable of continuous cyclic operation, including in combination
   a stationary support member,
   an electric motor supported by said support member and having a rotating shaft,
   a series of magnetically operated electrical switches mounted on said support member,
   converter means for converting unidirectional rotation of said shaft into reciprocating motion,
   a reciprocating member reciprocated relative to said support member and switches by said converter means upon rotation of said shaft, and
   magnetic switch-actuation means mounted on said reciprocating member for actuation of each of said switches in an order depending upon placement of said switches on said support member relative to the path of said switch-actuation means during reciprocation of said reciprocating member,
   said reciprocating member comprising a carriage carrying as said switch-actuation means at least one permanent magnet,
   said support member having a plurality of parallel guide rods on which said carriage moves lengthwise of said rods,
   return-spring means connecting said carriage to said support member,
   said converter means comprising cam means on said shaft and cam follower means on said carriage for reciprocating said carriage,
   said switches being glass-enclosed and in an inert atmosphere, whereby continuous use effects minimal wear on said switches.

2. A program device, including in combination
   a stationary support member having guide rods,
   an electric motor supported by said support member and having a rotating shaft with cam means thereon,
   a series of electrical switches mounted on said support member,
   a carriage mounted movably on said guide rods and having cam follower means and reciprocated on said guide rods relative to said support member and switches by unidirectional rotation of said shaft, said carriage having a plurality of slots,
   return-spring means connecting said carriage to said support member, and
   a plurality of rails of various lengths adjustably mounted in said slots, said switches having actuators actuated by said rails upon reciprocation of said carriage.

3. A program device, including in combination
   a stationary support member,
   an electric motor supported by said support member and having a rotating shaft,
   a first link rigidly secured to said shaft,
   second link means pivotally secured to said support member,
   a series of electrical switches mounted on said support member,
   a bar pivotally connected to said first link and pivotally connected to said second link means and reciprocated relative to said support member and switches by rotation of said shaft, and switch-actuation means mounted on said bar for actuation in sequence of each of said switches.

4. The device of claim 3 wherein said switches are sealed-glass-enclosed magnetic reed switches and said bar carries as said switch actuation means a permanent magnet.

5. The device of claim 3 wherein said second link means carries a second permanent magnet and an additional switch is mounted on said support member for actuation by said second magnet, the switches actuated by the first-named permanent magnet all being in series with said additional switch.

6. The device of claim 3 wherein said bar is connected to said shaft by a compound said first link and is connected to said support member by a second link means comprising a plurality of identical links, for parallel movement of said bar.

References Cited

UNITED STATES PATENTS

| 1,091,155 | 3/1914 | Murray | 200—16 X |
|---|---|---|---|
| 1,092,281 | 4/1914 | McWilliams | 200—16 |
| 1,350,924 | 10/1920 | Eaton | 200—17 X |
| 2,666,823 | 1/1954 | Wilson | 335—205 |
| 2,875,287 | 2/1959 | Van Sickle | 200—153 X |
| 3,187,120 | 6/1965 | Akst | 200—17 X |

FOREIGN PATENTS

| 982,529 | 2/1965 | Great Britain. |
|---|---|---|

BERNARD A. GILHEANY, *Primary Examiner.*

J. J. BAKER, H. BROOME, *Assistant Examiners.*